US011607944B2

(12) United States Patent
Jang et al.

(10) Patent No.: US 11,607,944 B2
(45) Date of Patent: Mar. 21, 2023

(54) APPARATUS AND METHOD FOR OPERATING ACCESSORIES OF VEHICLE DURING ENGINE STOP USING ONE-WAY CLUTCH PULLEY

(71) Applicant: Korea Advanced Institute of Science and Technology, Daejeon (KR)

(72) Inventors: InGwun Jang, Daejeon (KR); Dongsuk Kum, Daejeon (KR); Kyung-Soo Kim, Daejeon (KR); Kitae Jang, Daejeon (KR); Changwoo Lee, Daejeon (KR); Jong Ho Kim, Daejeon (KR); Kyunghwan Choi, Daejeon (KR); Mingi Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1148 days.

(21) Appl. No.: 16/204,256

(22) Filed: Nov. 29, 2018

(65) Prior Publication Data
US 2020/0001698 A1 Jan. 2, 2020

(30) Foreign Application Priority Data
Jun. 29, 2018 (KR) ........................ 10-2018-0075744

(51) Int. Cl.
*B60K 6/383* (2007.10)
*B60K 25/02* (2006.01)
(Continued)

(52) U.S. Cl.
CPC .............. *B60K 6/383* (2013.01); *B60K 25/02* (2013.01); *B60L 1/003* (2013.01); *F02B 67/06* (2013.01);
(Continued)

(58) Field of Classification Search
CPC .... F16H 7/02; F16H 2200/2035; F16H 55/36; F16H 2059/0221; F16H 2059/366;
(Continued)

(56) References Cited

U.S. PATENT DOCUMENTS

| 2 A | * | 7/1836 | Goulding | ............... D01G 21/00 57/58.49 |
| 428 A | * | 10/1837 | Dear | ................... C11D 3/0078 134/42 |

(Continued)

FOREIGN PATENT DOCUMENTS

| JP | 2013-223405 A | 10/2013 |
| KR | 10-2016-0049833 A | 12/2016 |

OTHER PUBLICATIONS

Korean Intellectual Property Office, Office Action, Korean Application No. 10-2018-0075744, dated Jul. 18, 2019, 6 pages (with concise explanation of relevance).

*Primary Examiner* — Henry Y Liu
(74) *Attorney, Agent, or Firm* — Fenwick & West LLP

(57) ABSTRACT

Disclosed is an apparatus and method for operating vehicular accessories during an engine stop using a one-way clutch pulley, the apparatus including the one-way clutch pulley configured to drive the vehicular accessories, and including a coupler and a one-way clutch. The one-way clutch pulley includes an engine crank shaft configured to connect to an engine of a vehicle; the coupler configured to couple with the engine crank shaft; the one-way clutch configured to couple with the coupler; and a pulley configured to connect to the one-way clutch, and the one-way clutch is configured to connect to the pulley and to rotate in one direction.

12 Claims, 13 Drawing Sheets

(51) Int. Cl.
*B60L 1/00* (2006.01)
*F16D 41/06* (2006.01)
*F16H 55/36* (2006.01)
*F02B 67/06* (2006.01)
*B60K 25/00* (2006.01)

(52) U.S. Cl.
CPC ............. *F16D 41/06* (2013.01); *F16H 55/36* (2013.01); *B60K 2025/005* (2013.01); *B60K 2025/022* (2013.01)

(58) Field of Classification Search
CPC .................. B60K 6/383; B60K 25/02; B60K 2025/005; B60L 1/003; F02B 67/06; F16D 51/06
USPC .................................................. 474/87, 148
See application file for complete search history.

(56) References Cited

U.S. PATENT DOCUMENTS

| | | | | |
|---|---|---|---|---|
| 3,731,774 A * | 5/1973 | Kitchin | ................. | F16D 41/067 192/45.007 |
| 3,853,098 A * | 12/1974 | Ishikawa | ................... | F01P 5/04 123/41.11 |
| 5,638,931 A * | 6/1997 | Kerr | ...................... | F16D 41/063 192/113.32 |
| 6,129,189 A * | 10/2000 | Kerr | ...................... | F16D 41/063 192/45.008 |
| 6,846,257 B2 * | 1/2005 | Baker | ...................... | B60K 6/48 903/910 |
| 7,013,646 B1 * | 3/2006 | Serkh | .............................. | 60/698 |
| 7,028,794 B2 * | 4/2006 | Odahara | ............... | B60W 10/30 475/5 |
| 7,559,384 B2 * | 7/2009 | Palladino | ................ | F16D 41/07 474/70 |
| 7,591,357 B2 * | 9/2009 | Antchak | ................. | F16F 15/12 192/81 C |
| 7,882,910 B2 * | 2/2011 | Kluge | .................... | B60W 10/02 180/65.265 |
| 8,313,400 B2 * | 11/2012 | Serkh | ...................... | F16H 55/36 474/69 |
| 2004/0149245 A1 * | 8/2004 | Moriya | ..................... | B60K 6/48 123/198 D |
| 2005/0215366 A1 * | 9/2005 | Serkh | ...................... | F02B 67/06 474/74 |
| 2006/0107920 A1 * | 5/2006 | Serkh | ...................... | F02B 73/00 123/198 R |
| 2008/0121445 A1 * | 5/2008 | Palladino | ................ | F16D 41/07 180/54.1 |
| 2010/0120563 A1 * | 5/2010 | Serkh | ...................... | F16H 55/36 474/74 |
| 2014/0274508 A1 * | 9/2014 | Crist | ...................... | B60K 6/383 474/94 |
| 2015/0192196 A1 * | 7/2015 | Yamamoto | ............... | F16H 55/36 474/144 |
| 2015/0291256 A1 * | 10/2015 | Taitt | ........................ | F16H 3/728 475/5 |
| 2016/0116031 A1 | 4/2016 | Koh et al. | | |
| 2016/0298722 A1 * | 10/2016 | Khosravi | ................. | F16F 15/26 |
| 2016/0318507 A1 * | 11/2016 | Aoki | ...................... | B60K 6/445 |
| 2017/0129474 A1 * | 5/2017 | Sato | ........................ | B60L 50/16 |
| 2017/0137013 A1 * | 5/2017 | Sato | ........................ | B60L 15/007 |
| 2017/0151939 A1 * | 6/2017 | Hokoi | ..................... | B60K 6/445 |
| 2017/0158188 A1 * | 6/2017 | Hokoi | ..................... | B60W 20/19 |
| 2017/0232950 A1 * | 8/2017 | Nishimine | ............ | B60W 20/00 701/22 |
| 2017/0240163 A1 * | 8/2017 | Suenaga | ................. | B60K 6/365 |
| 2017/0291587 A1 * | 10/2017 | Yanagida | ............... | B60W 10/02 |
| 2019/0176806 A1 * | 6/2019 | Trent | ...................... | B60K 6/48 |
| 2019/0186453 A1 * | 6/2019 | Choi | ...................... | F02N 11/04 |

* cited by examiner

APPARATUS AND METHOD FOR OPERATING ACCESSORIES OF VEHICLE DURING ENGINE STOP USING ONE-WAY CLUTCH PULLEY

CROSS-REFERENCE TO RELATED APPLICATION

This application claims the priority benefit of Republic of Korea Patent Application No. 10-2018-0075744, filed on Jun. 29, 2018, in the Korean Intellectual Property Office, the disclosure of which is incorporated herein by reference.

BACKGROUND

1. Field of the Invention

The following description of example embodiments relates to an apparatus and method for operating vehicular accessories during an engine stop using a one-way clutch pulley, and more particularly, to an apparatus and method using a one-way clutch pulley that may drive accessories through modification of a hybrid vehicle and an idle stop and go (ISG) vehicle without modifying other parts.

2. Description of the Related Art

FIG. 1 illustrates a configuration of an engine front portion of a general vehicle according to a related art.

Referring to FIG. 1, accessories configured to operate with power supplied from an engine are connected to an engine crank shaft using a pulley on an existing gasoline/diesel-based engine front portion. The engine front portion of the vehicle may include a coolant pump 11, an air conditioner compressor 12, a crank shaft pulley 13, a hydraulic pump 14, a vacuum pump, a generator 15, which constitute a single pulley to be supplied with a rotational force from the crank shaft pulley 13 by way of a single belt 16.

The coolant pump 11 cools an engine of the vehicle, the air conditioner compressor 12 cools a room of the vehicle, the hydraulic pump 14 performs power steering, and the generator 15 charges a battery. Also, the vacuum pump may assist brake pressure. However, to reduce fuel consumption and exhaust gas, the accessories provided on the engine front portion stop at the same time when an idle stop and go (ISG) vehicle stops or when a hybrid vehicle drives at low speed, that is, when the engine stops.

A gasoline engine and a diesel engine have significantly low fuel efficiency at a low speed. Also, a hybrid vehicle improves fuel efficiency and reduces exhaust gas by turning off an engine and driving the vehicle with a motor in low engine efficiency sections, for example, when the hybrid vehicle stops or drives at low speed. However, the smooth operation of accessories is required even during an engine stop.

For example, in terms of enhancing safety, if vacuum and hydraulic pumps are shut down on a ramp run or stop, it is very dangerous for a driver to brake and steer the vehicle only with the power of the driver. Also, in terms of enhancing the durability of parts, if coolant circulation stops when a turbine rotates at a high temperature and a high speed in an exhaust manifold, engine oil is combusted and adhered to cause an engine failure. In terms of enhancing user convenience, if an air conditioner compressor stops, it is impossible to cool an indoor space of the vehicle. Also, if the battery is discharged, it is impossible to start the vehicle and electric parts of the vehicle.

In the case of a vehicle with an internal combustion engine, fuel efficiency is degraded and the large quantity of exhaust gas occurs due to stop of the vehicle or an engine operation during low-speed driving. A minimum rotational speed, typically, around 800 rpm, of the crank shaft is required to run the engine. When the vehicle is stopped, idling of the engine is required to operate accessories of the vehicle. Such idling of the engine causes the reduction of fuel efficiency and the large quantity of exhaust gas, which may be against the basic purpose of the hybrid vehicle and the ISG vehicle.

FIGS. 2A and 2B illustrate a procedure of operating accessories of a hybrid vehicle equipped with a hybrid starter generator (HSG) according to the related art.

Referring to FIG. 2A, in general, the hybrid vehicle operates the accessories by including a high cost HSG capable of starting an engine and generating power at a location of an existing alternator that serves to generate power only. The HSG is in charge of starting and power generation only and the engine needs to be ON to drive the accessories.

Referring to FIG. 2B, in response to receiving an operation signal in operation 21, the hybrid vehicle equipped with the HSG starts the HSG in operation 22. When the HSG is started to reach a desired speed or more, the engine starts in operation 230 and the accessories operate in operation 24.

However, the hybrid vehicle equipped with the HSG may not cope with emergency situations due to its low reaction rate and controllability. When the HSG is accelerated from a stop state, for example, 0 rpm, to a minimum rational speed, for example, about 800 rpm, at which the engine may start, the engine may start to normally operate the accessories. In addition, the hybrid vehicle has a low reaction rate and thus does not readily cope with emergency situations, such as sudden brake and steering.

Also, since a high-cost starter generator is applied, price of a vehicle increases. A high output motor of, for example, 10 kilowatts (kW) or more is required to generate the minimum torque required for starting the engine. The price of the high output motor is three times or more than that of an existing 1.5 kW alternator that is in charge for power generation only.

Accordingly, it is possible to electrify all of accessories based on engine power so that the accessories may operate with power supplied from a battery. However, the accessories, for example, a vacuum pump, a hydraulic pump, a coolant pump, and an air conditioner compressor, need to be separately configured in an electrical manner, which may cause an increase in the price of the vehicle. Accordingly, there is a need for a method of operating accessories of a hybrid vehicle at low cost. To this end, existing parts and power transmission structure need to be utilized to the maximal extents. Korean Patent Laid-Open Publication No. 10-2016-0049833 describes an engine pulley structure of a hybrid vehicle and a control method thereof.

SUMMARY

At least one example embodiment provides an apparatus and method for operating vehicular accessories during an engine stop using a one-way clutch pulley, and more particularly, to technology for operating accessories of a hybrid vehicle at low cost through a minimum modification by applying a one-way clutch pulley.

At least one example embodiment also provides an apparatus and method for operating vehicular accessories during an engine stop using a one-way clutch pulley capable of operating existing accessories of an engine at low cost by driving a motor generator although the engine stops.

According to an aspect of at least one example embodiment, there is provided an apparatus for operating vehicular accessories during an engine stop using a one-way clutch pulley, the apparatus including the one-way clutch pulley configured to drive the vehicular accessories, and including a coupler and a one-way clutch.

The one-way clutch pulley may include an engine crank shaft configured to connect to an engine of a vehicle; the coupler configured to couple with the engine crank shaft; the one-way clutch configured to couple with the coupler; and a pulley configured to connect to the one-way clutch, and the one-way clutch may be configured to connect to the pulley and to rotate in one direction.

The one-way clutch may be configured to operate by overrunning of an inner ring or overrunning of an outer ring and to independently drive the pulley and the engine crank shaft.

The apparatus may further include a motor generator configured to rotate the pulley. The motor generator may be configured to operate while an engine of a hybrid vehicle is in a stop state, to rotate the pulley and to operate the vehicular accessories based on power of the engine.

According to an aspect of at least one example embodiment, there is provided a one-way clutch pulley including an engine crank shaft configured to connect to an engine of a vehicle; a coupler configured to couple with the engine crank shaft; a one-way clutch configured to couple with the coupler; and a pulley configured to connect to the one-way clutch. The one-way clutch is configured to connect to the pulley and to rotate in one direction.

The one-way clutch may be configured to operate by overrunning of an inner ring or overrunning of an outer ring such that the pulley and the engine crank shaft independently operate.

The one-way clutch may be configured to operate by overrunning of the inner ring, and the pulley and the engine crank shaft are enabled to independently operate by way of the one-way clutch in such a manner that the coupler is in a salient structure, the salient structure couples with the inner ring of the one-way clutch, and the pulley is connected to the outer ring of the one-way clutch.

The one-way clutch may be configured to operate by overrunning of the outer ring, and the pulley and the engine crank shaft are enabled to independently operate by way of the one-way clutch in such a manner that the coupler receives at least a portion of the one-way clutch to couple with the outer ring of the one-way clutch and the pulley is connected to the inner ring of the one-way clutch.

The one-way clutch pulley may further include a motor generator configured to rotate the pulley. The motor generator may be configured to operate while an engine of a hybrid vehicle is in a stop state, to rotate the pulley and to operate vehicular accessories with power of the engine.

An inner ring and an outer ring of the one-way clutch may be configured to be separate from each other when a speed difference between the inner ring and the outer ring is greater than a specific speed, and the pulley and the engine crank shaft may be configured to independently operate in such a manner that, when the engine of the vehicle is stopped, the pulley rotates through driving of the motor generator to rotate the outer ring of the one-way clutch connected to the pulley and to stop the inner ring of the one-way clutch.

An inner ring and an outer ring of the one-way clutch may be configured to mechanically engage with each other when a speed difference between the inner ring and the outer ring is less than a specific speed, and the inner ring and the outer ring of the one-way clutch may be configured to mechanically engage with each other and rotate together in such a manner that, when the engine of the vehicle is started using a separate starter, a rotational speed of the engine crank shaft connected to the engine of the vehicle increases to be higher than a rotational speed of the pulley.

The pulley may include a single and one-way fan belt pulley.

The motor generator may include a low level motor configured to drive the one-way clutch and the vehicular accessories without driving the engine crank shaft.

According to an aspect of at least one example embodiment, there is provided a method of driving vehicular accessories during an engine stop using a one-way clutch pulley, the method including driving a motor generator when an engine of a vehicle is stopped; rotating a pulley through driving of the motor generator; and rotating a one-way clutch connected to the pulley in one direction. The motor generator is configured to operate while the engine of the vehicle is in a stop state, to rotate the pulley and to operate the vehicular accessories based on power of the engine.

In the rotating of the one-way clutch connected to the pulley in one direction, the pulley and the engine crank shaft are enabled to independently operate in such a manner that, when a speed difference between the inner ring and the outer ring of the one-way clutch is greater than a specific speed, the inner ring and the outer ring of the one-way clutch are separate from each other and the inner ring of the one-way clutch stops instead of rotating.

The method may further include mechanically engaging and rotating an inner ring and an outer ring of the one-way clutch together in such a manner that, when the engine of the vehicle is started using a separate starter, a rotational speed of an engine crank shaft connected to the engine of the vehicle increases to be higher than a rotational speed of the pulley.

According to example embodiments, there is provided an apparatus and method for operating vehicular accessories during an engine stop using a one-way clutch pulley capable of driving a motor generator at low cost although an engine stops. Accordingly, it is possible to operate the vehicular accessories at low cost through a minimum modification of an existing high cost system. In particular, there is no need to modify other parts since a pulley rotates in one direction.

Also, according to example embodiments, since it is possible to maintain and utilize existing parts of a vehicle and power transmission system to the maximum extents, it is possible to operate accessories of an engine at minimum cost although the engine stops.

Also, according to example embodiments, although a motor generator does not need to serve as a starter of an engine, it is possible to save cost and to provide a one-way clutch pulley capable of overrunning during an engine stop by separating a function of a starter.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
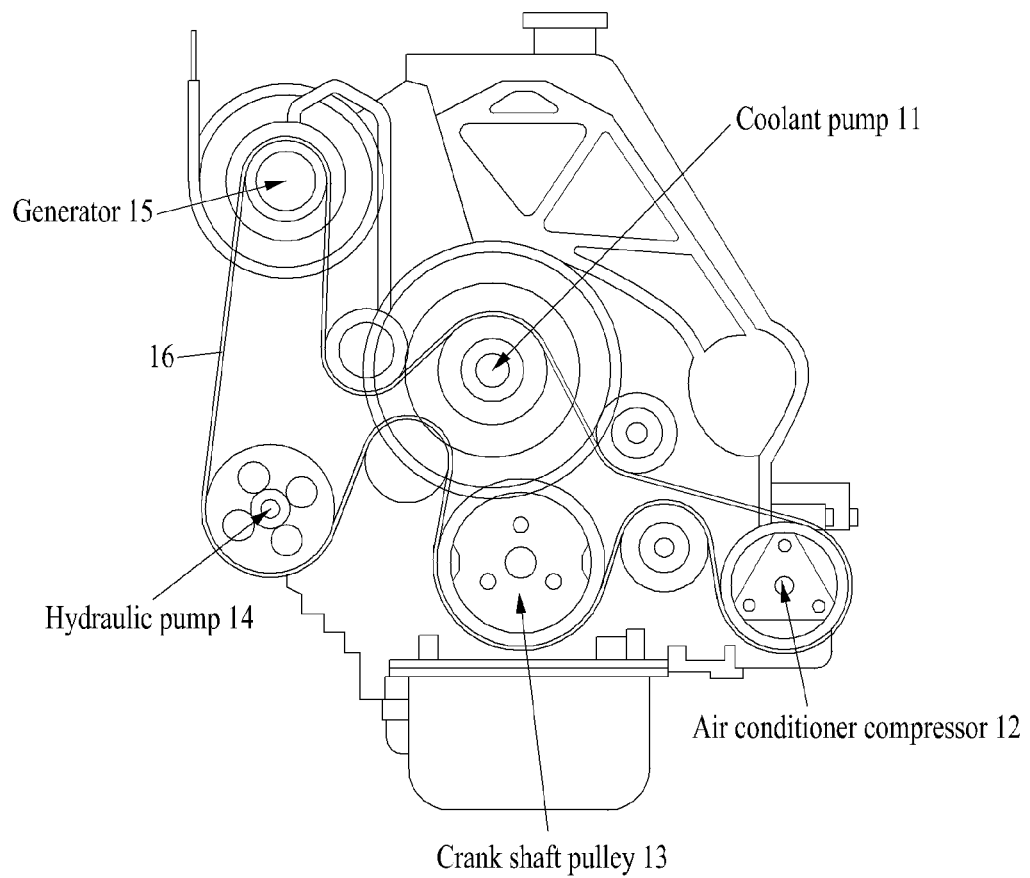
FIG. 1 illustrates a configuration of an engine front portion of a general vehicle according to a related art.
Figure 2A:
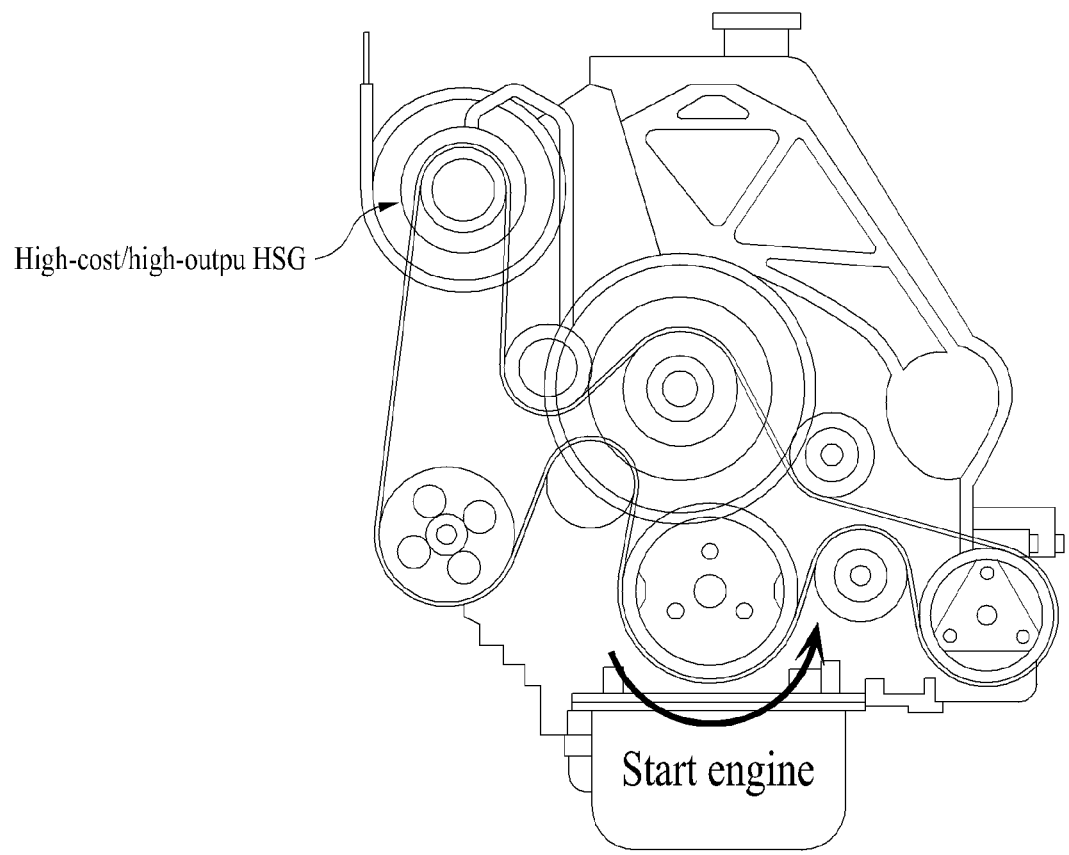
FIGS. 2A and 2B illustrate a procedure of operating accessories of a hybrid vehicle equipped with a hybrid starter generator (HSG) according to the related art.
Figure 2B:
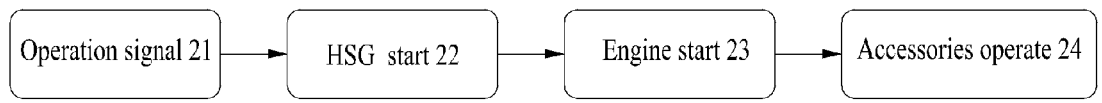

One or more example embodiments will be described with reference to the accompanying drawings. Advantages and features of the example embodiments, and methods for achieving the same may become explicit by referring to the accompanying drawings and the following example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

When an element or a layer is referred to as being "on," "connected to," "coupled to," or "adjacent to," another element or layer, the element or the layer may be directly on, connected to, coupled to, or adjacent to, the other element or layer, or one or more other intervening elements or layers may be present. In contrast, when an element or a layer is referred to as being "directly on," "directly connected to," "directly coupled to," or "immediately adjacent to," another element or layer, there are no intervening elements or layers present.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Hereinafter, example embodiments will be described with reference to the accompanying drawings. Shapes and sizes, etc., of components in the drawings may be exaggerated for clarity of description.

The following example embodiments relate to technology for operating accessories of a hybrid vehicle at low cost by applying a one-way clutch pulley capable of operating existing accessories of an engine by driving a motor generator although the engine stops.

In particular, the example embodiments may provide a one-way clutch pulley including a separate coupler and a one-way clutch in order to operate existing engine power based accessories using a single and one-way fan belt by driving a motor generator although an engine of a vehicle stops. Here, the one-way clutch pulley may operate by overrunning of an inner ring or an outer ring.

According to the example embodiments, a generator may include a separate starter and a single and one-way fan belt to supply power to accessories, and the existing accessories may be used without a separate modification since the fan belt rotates in one direction by a one-way clutch pulley structure.

Figure 3:
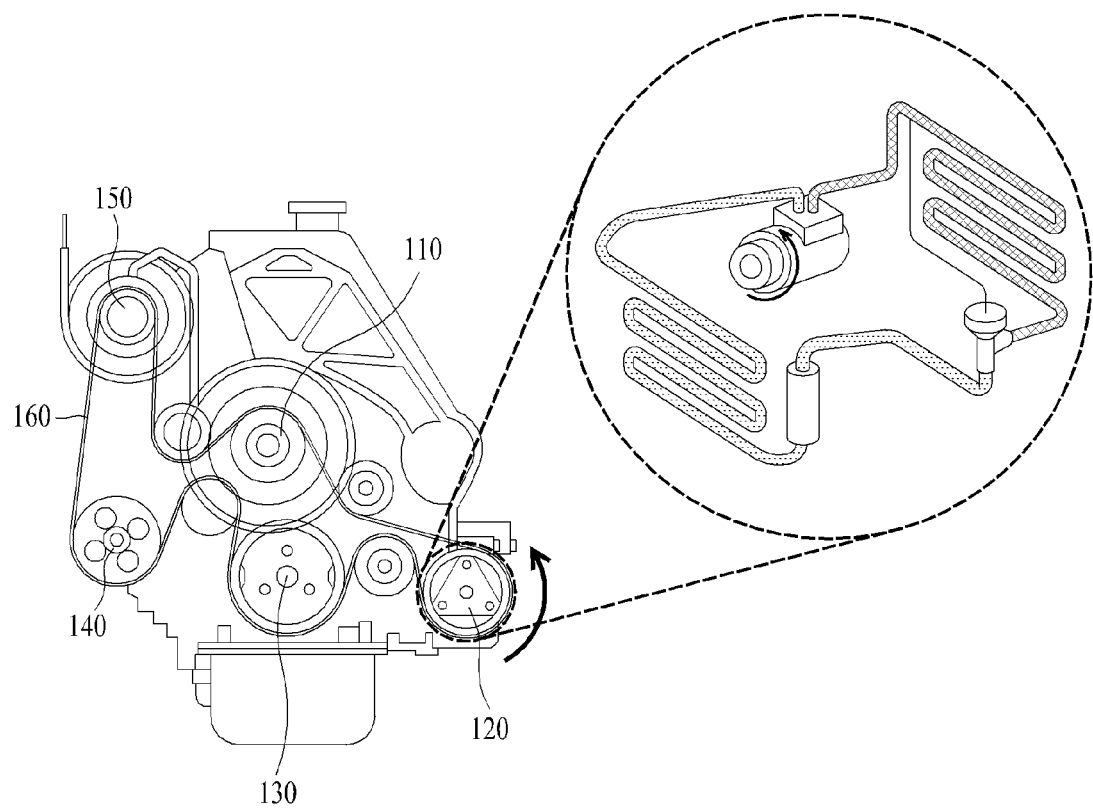
FIG. 3 illustrates an apparatus for operating vehicular accessories during an engine stop using a one-way clutch pulley according to an example embodiment.

FIG. 3 illustrates an apparatus for operating vehicular accessories during an engine stop using a one-way clutch pulley according to an example embodiment.

Referring to FIG. 3, the apparatus for operating the vehicular accessories during the engine stop using the one-way clutch pulley may include a one-way clutch pulley 130 configured to drive the vehicular accessories, and including a coupler and a one-way clutch, and may further include a motor generator depending on example embodiments. Also, the apparatus for operating the vehicular accessories during the engine stop using the one-way clutch pulley may include accessories connected to the one-way clutch pulley 130 by way of a single belt 160. The accessories may include a coolant pump 110, an air conditioner compressor 120, a hydraulic pump 140, and a generator 150. Here, the generator 150 may not include a starter function.

The one-way clutch pulley 130 may include an engine crank shaft configured to connect to an engine of a vehicle, the coupler configured to couple with the engine crank shaft, the one-way clutch configured to couple with the coupler, and a pulley configured to connect to an outer ring or an inner ring of the one-way clutch. The inner ring or the outer ring of the one-way clutch may connect to the pulley and rotate in one direction.

The one-way clutch may operate by overrunning of the inner ring or overrunning of the outer ring and may independently drive the pulley and the engine crank shaft.

For example, the one-way clutch may operate by overrunning of the inner ring, and the pulley and the engine crank shaft may independently operate by way of the one-way clutch in such a manner that the coupler is in a salient structure, the salient structure couples with the inner ring of the one-way clutch, and the pulley is connected to the outer ring of the one-way clutch.

As another example, the one-way clutch may operate by overrunning of the outer ring, and the pulley and the engine crank shaft may independently operate by way of the one-way clutch in such a manner that the coupler receives at least a portion of the one-way clutch to couple with the outer ring of the one-way clutch and the pulley is connected to the inner ring of the one-way clutch.

The one-way clutch pully may further include a motor generator (motor/generator) configured to rotate the pulley. The motor generator may operate while the engine of the vehicle is in a stop state, to rotate the pulley and to operate vehicular accessories with power of the engine. In particular, the motor generator may operate while an engine of a hybrid vehicle is in a stop state to thereby operate the vehicular accessories with the power of the engine.

In the example embodiment, in a system that includes a separate engine starter, the motor generator may have the minimum specification capable of operating the accessories. In particular, the one-way clutch pulley 130 equipped with the separate coupler and the one-way clutch may connect to the engine by way of a single and one-way fan belt and may supply power to the accessories in response to the single and one-way fan belt rotating in the same direction as a case in which the engine operates, even during an engine stop and the engine crank shaft may independently operate by way of the one-way clutch. Here, an additional fan belt is not required for the single and one-way fan belt. When the engine is started by a separate starter and a rotational speed of the engine crank shaft reaches a rotation speed or more of a belt driving shaft, the engine crank shaft and the belt driving shaft may mechanically engage with each other by way of the one-way clutch, the accessories may be supplied with the power from the engine, and the motor/generator may function to generate the power.

According to the example embodiments, since it is possible to maintain and utilize existing parts and power transmission system of a vehicle to maximum extents, it is possible to drive accessories of the engine at low cost even during an engine stop.

Hereinafter, the one-way clutch pulley 130 will be further described.

Figure 4A:
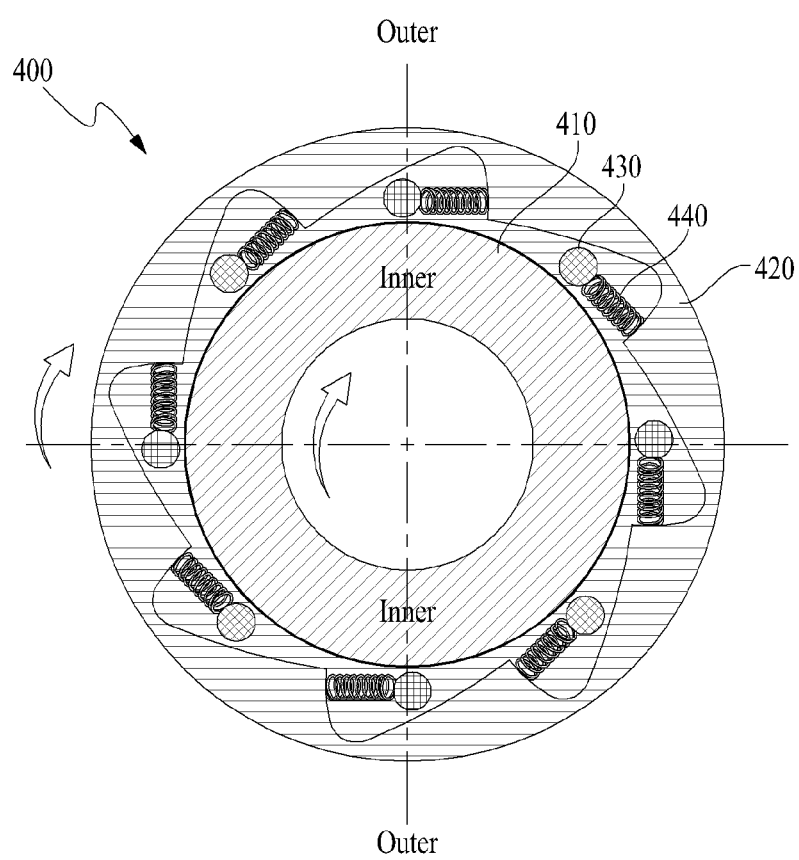
FIGS. 4A and 4B illustrate the operational principle of a one-way clutch according to an example embodiment.
Figure 4B:
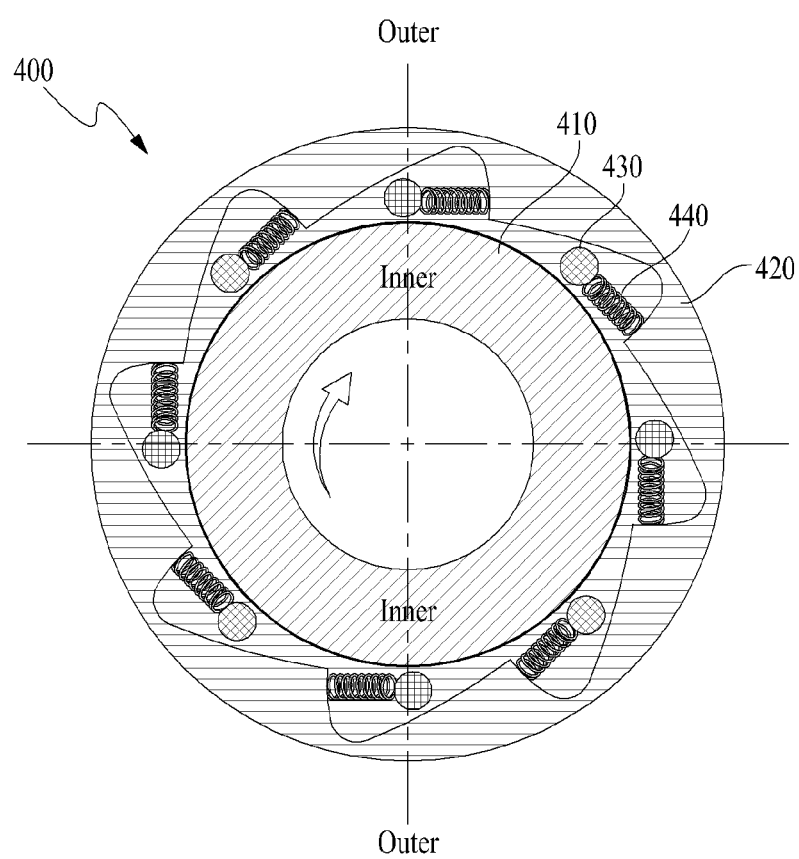

FIGS. 4A and 4B illustrate the operational principle of a one-way clutch according to an example embodiment. In detail, FIG. 4A illustrates an example of a one-way clutch in a locked state according to an example embodiment and FIG. 4B illustrates an example of a one-way clutch in an idling state according to an example embodiment.

Referring to FIGS. 4A and 4B, a one-way clutch 400 may include an inner ring 410 and an outer ring 420. The inner ring 410 and the outer ring 420 may mechanically engage with or separate from each other through a ball bearing 430 and a spring 440 provided between the inner ring 410 and the outer ring 420.

Referring to FIG. 4A, when a speed difference between the inner ring 410 and the outer ring 420 of the one-way clutch 400 is less than a specific speed, the inner ring 410 and the outer ring 420 may engage with each other and rotate together, which is referred to as a locked state.

Referring to FIG. 4B, when the speed difference between the inner ring 410 and the outer ring 420 of the one-way clutch 400 is greater than the specific speed, the inner ring 410 and the outer ring 420 may be separate from each other and independently rotate, which is referred to as an idling state.

Hereinafter, a method of applying a one-way clutch according to an example embodiment is described.

Figure 5A:
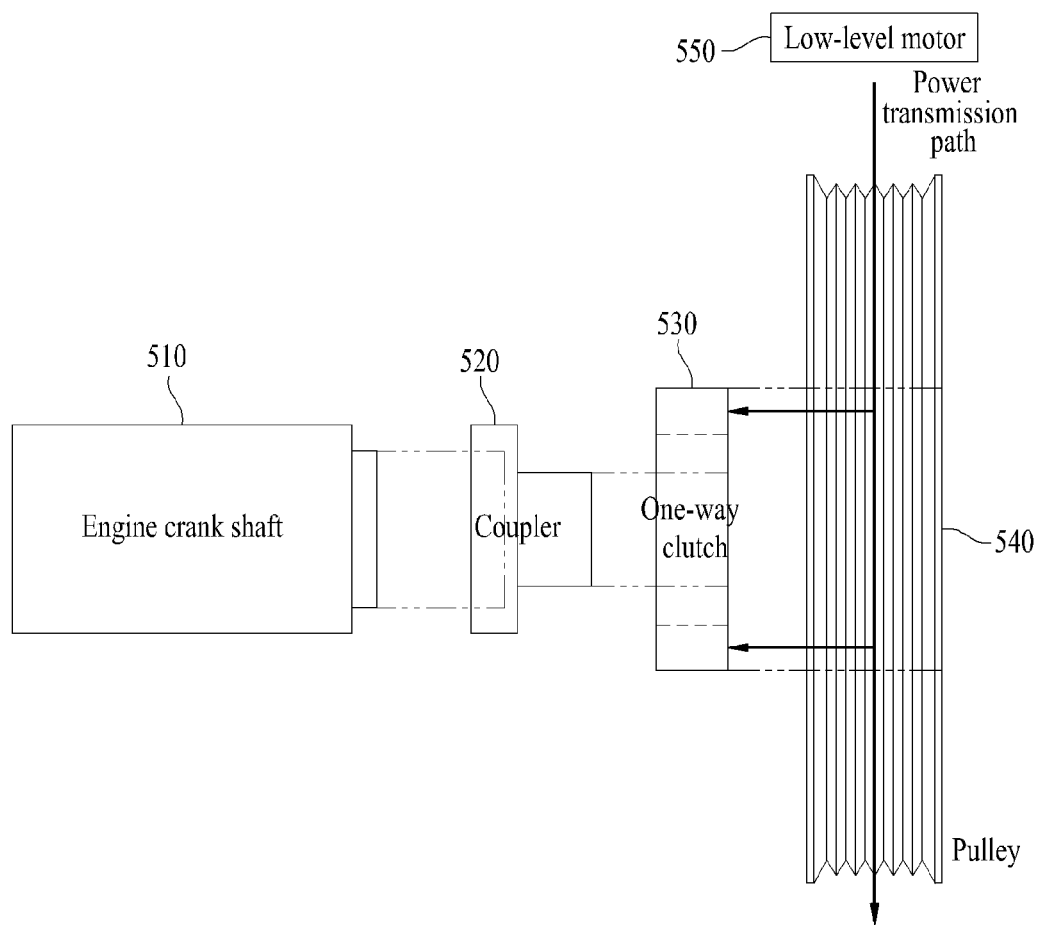
FIGS. 5A and 5B illustrate an operation of a one-way clutch by overrunning of an inner ring according to an example embodiment.
Figure 5B:
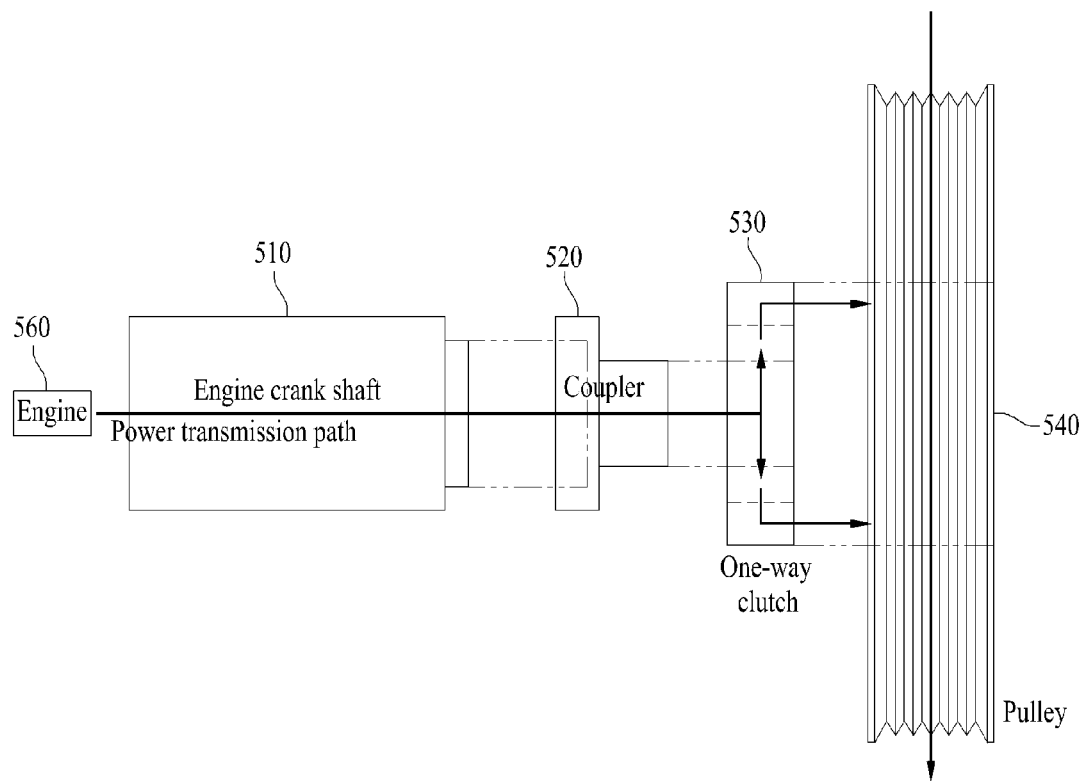

FIGS. 5A and 5B illustrate an operation of a one-way clutch by overrunning of an inner ring according to an example embodiment. In detail, FIG. 5A illustrates an example of a power transmission path when an engine stops by overrunning of an inner ring according to an example embodiment and FIG. 5B illustrates an example of a power transmission path when an engine starts by overrunning of an inner ring according to an example embodiment.

FIGS. 5A and 5B illustrate examples of an exploded cross-sectional view to describe an operation of the one-way clutch by overrunning of the inner ring. Referring to FIGS. 5A and 5B, a separate coupler 520 may be mounted to an engine crank shaft 510, a salient structure of the coupler 520 may couple with the inner ring of the one-way clutch 530, and an outer ring of the one-way clutch 530 may connect to a pulley 540. In this manner, the one-way clutch 530 may rotate in only one direction. Here, the pulley 540 may be configured as a single and one-way fan belt pulley. Also, an existing pulley mounted to an existing engine crank shaft may be used for the pulley 540.

Referring to FIG. 5A, when the pulley 540 starts to rotate by way of a motor generator 550 during an engine stop, the outer ring of the one-way clutch 530 may rotate and the inner ring thereof may stop. Accordingly, the pulley 540 and the engine crank shaft 510 may independently operate. Here, a low level motor may be used for the motor generator 550. That is, when a speed difference between the inner ring and the outer ring of the one-way clutch 530 reaches a specific speed or more, the inner ring and the outer ring may be separate from each other and only the outer ring of the one-way clutch 530 connected to the pulley 540 may independently rotate. That is, the one-way clutch 530 may enter into the idling state described above with reference to FIG. 4B.

Here, the outer ring of the one-way clutch 530 connected to the pulley 540 rotates in the same direction as a direction in which the pulley 540 moves and rotates in a forward direction. As described above, by providing a structure capable of applying overrunning of the inner ring, accessories may rotate in the same one direction as in the existing operation method. Accordingly, there is no need to particularly modify the accessories.

Referring to FIG. 5B, when an engine 560 is started by a separate starter, a speed of the engine crank shaft 510 may become higher than that of the pulley 540. In this case, the inner ring and the outer ring of the one-way clutch 530 may mechanically engage with each other and rotate together. That is, when the speed difference between the inner ring and the outer ring of the one-way clutch 530 is less than the specific speed, the inner ring and the outer ring may mechanically engage with each other and rotate together. The one-way clutch 530 may enter into the locked state described above with reference to FIG. 4A.

Here, the outer ring and the inner ring of the one-way clutch 530 connected to the pulley 540 rotate in the same direction as a direction in which the pulley 540 moves and rotate in a forward direction.

Figure 6A:
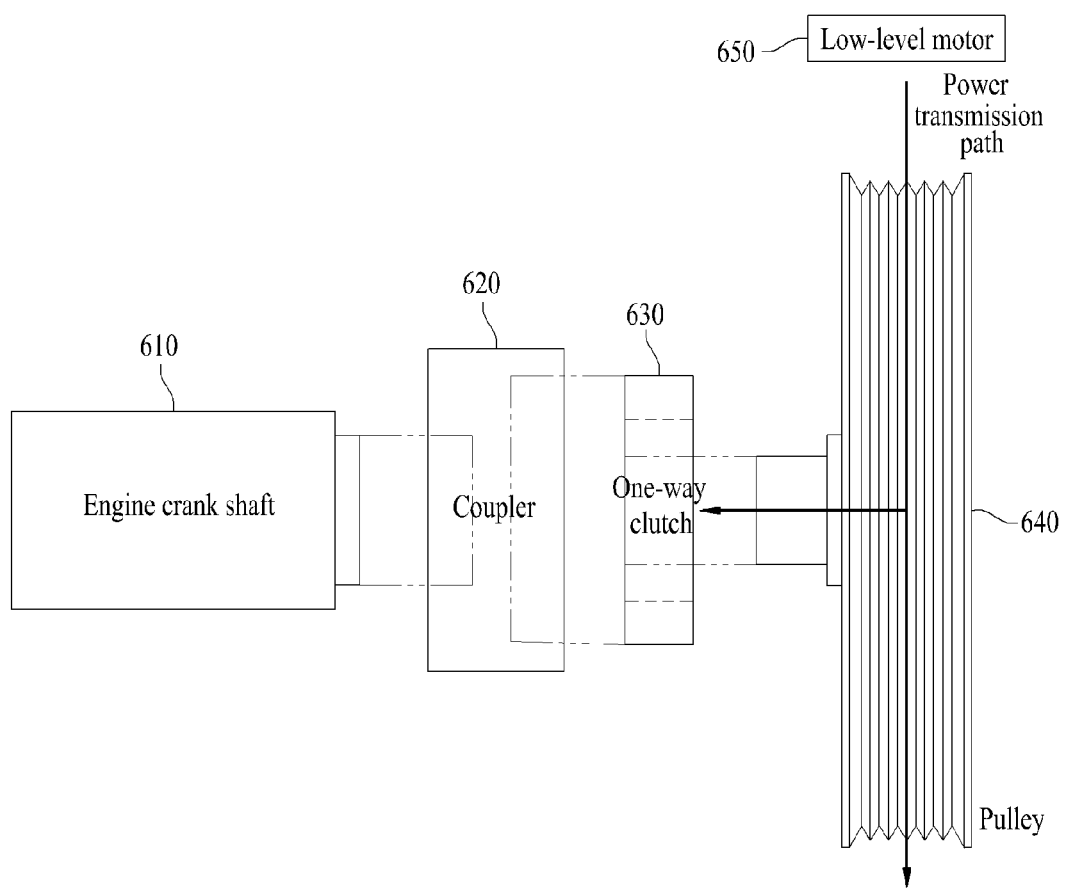
FIGS. 6A and 6B illustrate an example of a one-way clutch by overrunning of an outer ring according to an example embodiment.
Figure 6B:
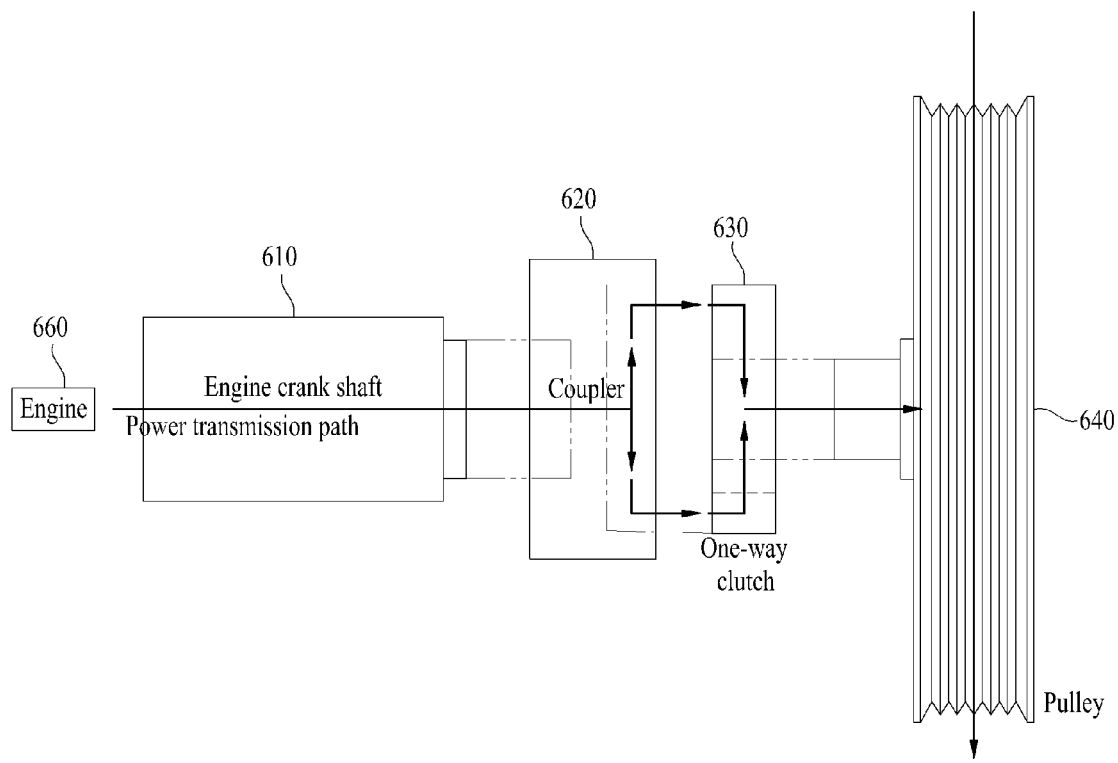

FIGS. 6A and 6B illustrate examples of a one-way clutch by overrunning of an outer ring according to an example embodiment. In detail, FIG. 6A illustrates an example of a power transmission path when an engine stops by overrunning of an outer ring according to an example embodiment and FIG. 6B illustrates an example of a power transmission path when an engine starts by overrunning of an outer ring according to an example embodiment.

FIGS. 6A and 6B illustrate examples of an exploded cross-sectional view to describe an operation of the one-way clutch by overrunning of the outer ring. Referring to FIGS. 6A and 6B, a separate coupler 620 may be mounted to an engine crank shaft 610, the coupler 620 may couple with an outer ring of a one-way clutch 630 and the engine crank shaft 610, and an inner ring of the one-way clutch 630 may connect to the pulley 640. In this manner, the one-way clutch 630 may rotate in only one direction. Here, the pulley 640 may be configured as a single and one-way fan belt pulley. Also, an existing pulley mounted to an existing engine crank shaft may be used for the pulley 640.

Referring to FIG. 6A, when the pulley 640 starts to rotate by way of a motor generator 650 during engine stop, the inner ring of the one-way clutch 630 may rotate and the outer ring thereof may stop. Accordingly, the pulley 640 and the engine crank shaft 610 may independently operate. Here, a low level motor may be used for the motor generator 650. That is, the one-way clutch 630 may enter into the idling state described above with reference to FIG. 4B.

Here, the outer ring of the one-way clutch 630 connected to the pulley 640 rotates in the same direction in a direction in which the pulley 640 moves and rotates in a forward direction.

Referring to FIG. 6B, when an engine 660 is started by a separate starter, a speed of the engine crank shaft 610 may become higher than that of the pulley 640. In this case, the inner ring and the outer ring of the one-way clutch 630 may mechanically engage with each other and rotate together. That is, when the speed difference between the inner ring and the outer ring of the one-way clutch 630 is less than the specific speed, the inner ring and the outer ring may mechanically engage with each other and rotate together. The one-way clutch 630 may enter into the locked state described above with reference to FIG. 4A.

Here, the outer ring and the inner ring of the one-way clutch 630 connected to the pulley 640 rotate in the same direction as a direction in which the pulley 640 moves and rotate in a forward direction. As described above, by providing a structure capable of applying overrunning of the outer ring, accessories may rotate in the same one direction as in the existing operation method. Accordingly, there is no need to particularly modify the accessories.

Figure 7A:
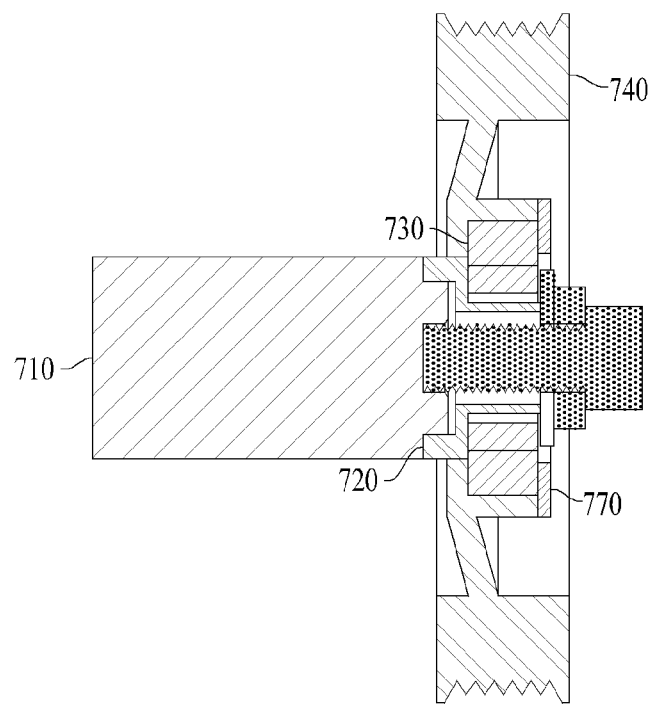
FIGS. 7A and 7B are a side-cross sectional view and an exploded perspective view illustrating a one-way clutch pulley according to an example embodiment, respectively.
Figure 7B:
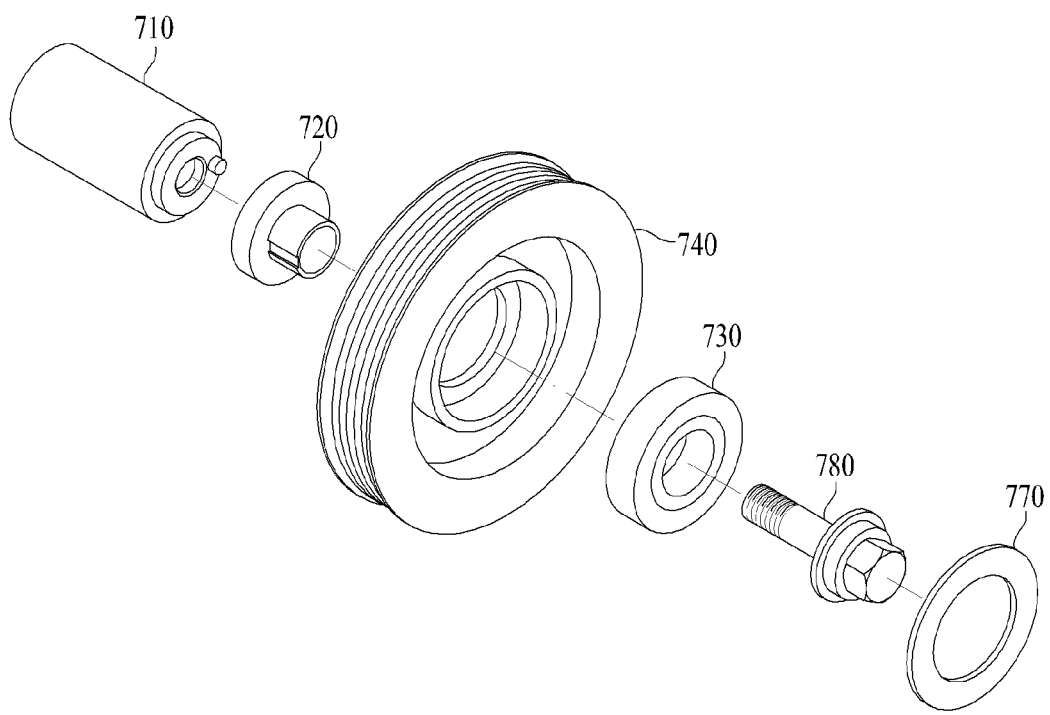

FIGS. 7A and 7B illustrate examples of a one-way clutch pulley according to an example embodiment. In detail, FIG. 7A is a side-cross sectional view of a one-way clutch pulley according to an example embodiment and FIG. 7B is an exploded perspective view of the one-way clutch pulley according to an example embodiment.

FIGS. 7A and 7B illustrate examples of a one-way clutch pulley to which overrunning of an inner ring is applied. Referring to FIGS. 7A and 7B, a coupler 720 may be mounted to an engine crank shaft 710, a salient structure of the coupler 720 may couple with an inner ring of the one-way clutch 730, and an outer ring of the one-way clutch 730 may connect to a pulley 740. In this manner, the one-way clutch 730 may rotate in only one direction. Here, a fastening screw 780 may be added to fasten and couple the engine crank shaft 710, the coupler 720, the pulley 740, and the one-way clutch 730 with one another. A cover 770 may be further provided.

The one-way clutch 730 according to an example embodiment may include the engine crank shaft 710, the coupler 720, the one-way clutch 730, and the pulley 740, and may further include a motor generator depending on example embodiments.

The engine crank shaft 710 may connect to an engine of a vehicle and may rotate in response to driving of the engine.

The coupler 720 may couple with the engine crank shaft 710 and may rotate in response to rotation of the engine crank shaft 710.

The one-way clutch 730 may couple with the coupler 720. For example, the one-way clutch 730 may include the inner ring and the outer ring, and a ball bearing and a spring may be provided between the inner ring and the outer ring such that the inner ring and the outer ring may mechanically engage with each other or be separate from each other.

The one-way clutch 730 may rotate in one direction in such a manner that the pulley 740 connects to the outer ring of the one-way clutch 730 and the outer ring of the one-way clutch 730 connects to the pulley 740. Here, the pulley 740 may be configured as a single and one-way fan belt pulley.

As described above, the one-way clutch 730 may operate by overrunning of the inner ring or by overrunning of the outer ring such that the pulley 740 and the engine crank shaft 710 may independently operate.

For example, the one-way clutch 730 may operate by overrunning of the inner ring and the pulley 740 and the engine crank shaft 710 may independently operate by way of the one-way clutch 730 in such a manner that the coupler 720 is in a salient structure and the salient structure couples with the inner ring of the one-way clutch 730.

As another example, the one-way clutch 730 may operate by overrunning of the outer ring and the pulley 740 and the engine crank shaft 710 may independently operate by way of the one-way clutch 730 in such a manner that the coupler 720 receives at least a portion of the one-way clutch 730 to couple with the outer ring of the one-way clutch 730.

Also, the one-way clutch 730 may further include a motor generator configured to rotate the pulley 740.

The motor generator may operate while the engine of the vehicle is in a stop state and may rotate the pulley 740 to operate vehicular accessories with power of the engine. In particular, the motor generator may operate while an engine of a hybrid vehicle is in a stop state and may operate vehicular accessories with the power of the engine. Here, the motor generator may include a low level motor configured to drive the pulley 740, the one-way clutch 730, and the vehicular accessories without driving the engine crank shaft 710. Here, the low level motor may be used to save cost by applying a low-specification motor generator for driving only the accessories in an existing vehicle to which a separate engine starter is mounted.

When a speed difference between the inner ring and the outer ring of the one-way clutch 730 is greater than a specific speed, the inner ring and the outer ring may be separate from each other. When the engine of the vehicle stops, the one-way clutch 730 may rotate the pulley 740 by way of driving of the motor generator and the outer ring of the one-way clutch 730 connected to the pulley 740 rotates and the inner ring thereof stops. In this manner, the pulley 740 and the engine crank shaft may independently operate.

When the speed difference between the inner ring and the outer ring of the one-way clutch 730 is less than the specific speed, the inner ring and the outer ring may mechanically engage with each other. When the engine of the vehicle is started by a separate starter, a rotational speed of the engine crank shaft 710 connected to the engine of the vehicle may become higher than that of the pulley 740. Accordingly, the inner ring and the outer ring of the one-way clutch 730 may mechanically engage with each other and rotate together.

According to the example embodiments, it is possible to supply power to accessories of a hybrid vehicle at low cost by applying the one-way clutch 730 and the pulley 740, and to drive the accessories of the hybrid vehicle at minimum cost through a structure of the one-way clutch 730 including the separate couple 720 and the one-way clutch 730 and the pulley 740, that is, overrunning of the inner ring and the outer ring.

According to the example embodiments, during an engine stop, it is possible to supply power to the accessories by rotating a fan belt in the same direction through driving of the motor generator. The power by the motor generator may be blocked by the one-way clutch 730 and the engine crank shaft 710 may independently operate.

Figure 8:
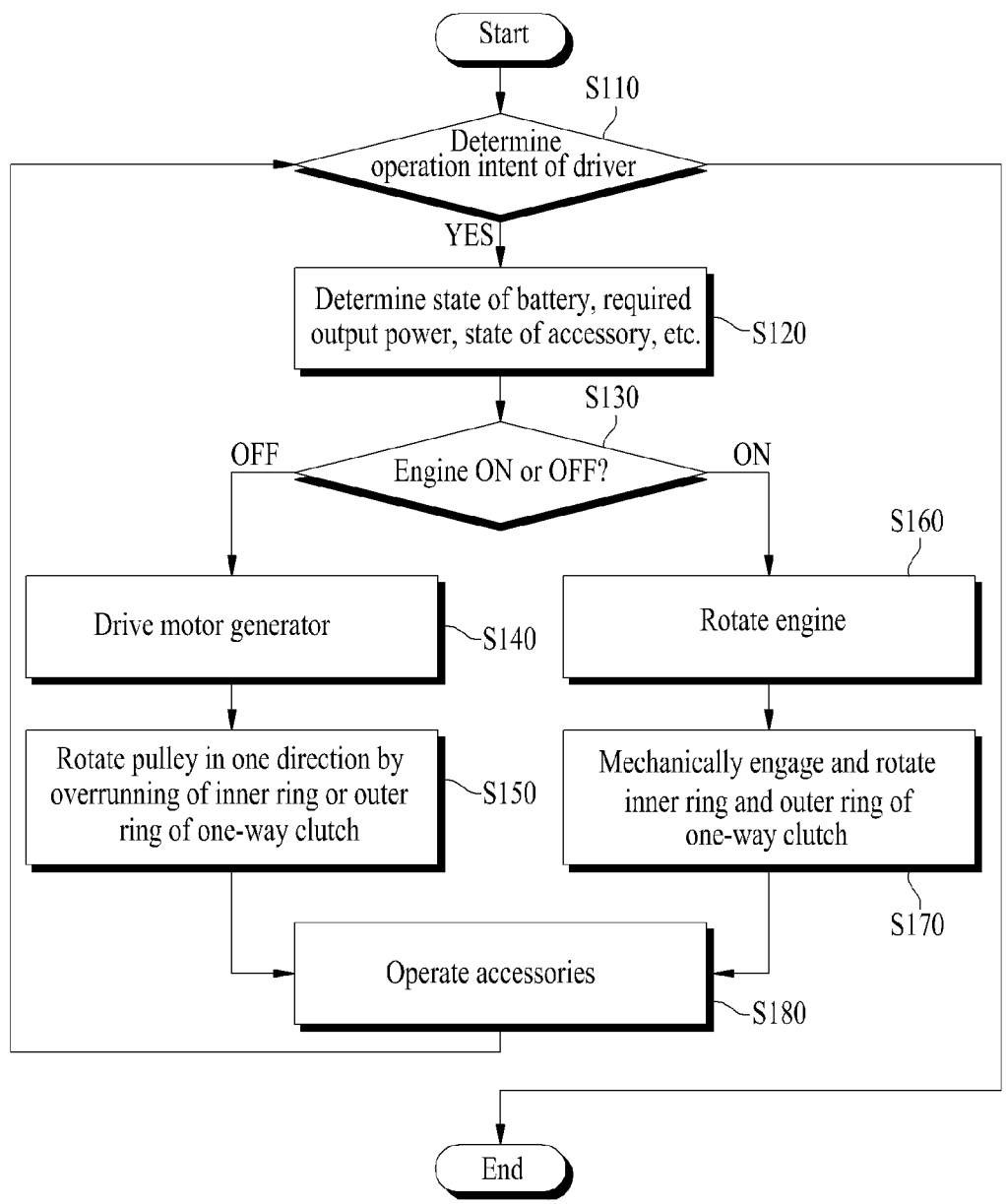
FIG. 8 is a flowchart illustrating a method of operating vehicular accessories during an engine stop using a one-way clutch pulley according to an example embodiment.

FIG. 8 is a flowchart illustrating a method of operating vehicular accessories during an engine stop using a one-way clutch pulley according to an example embodiment.

Referring to FIG. 8, the method (hereinafter, also referred to as an accessory operation method) of operating the vehicular accessories during the engine stop using the one-way clutch pulley may determine whether an engine of a vehicle is ON or OFF in operation S130, and may rotate the engine in operation S160 when the engine is ON and may drive a motor generator in operation S140 when the engine is OFF. Prior to determining whether the engine is ON or OFF in operation S130, the accessory operation method may determine an operation intent of a driver in operation S110 and may verify a state of a battery, required output power, and a state of an accessory, etc., in operation S120.

When the engine of the vehicle is stopped, the accessory operation method may include operation S140 of driving the motor generator, operation 150 of rotating a pulley through driving of the motor generator and rotating an outer ring of the one-way clutch connected to the pulley in one direction, and operation S180 of operating the vehicular accessories with the power of the engine as the pulley rotates by driving the motor generator when the engine of the vehicle is in a stop state. In particular, in operation S150 of rotating the one-way clutch connected to the pulley in one direction, the outer ring of the one-way clutch connected to the pulley may rotate in one direction. Here, the pulley and the engine crank shaft may independently operate by way of the one-way clutch in such a manner that the coupler is in a salient structure, the salient structure couples with the inner ring of the one-way clutch, and the pulley is connected to the outer ring of the one-way clutch. Accordingly, when a speed difference between the inner ring and the outer ring of the one-way clutch is greater than a specific speed, the inner ring and the outer ring may be separate from each other, the inner ring of the one-way clutch may stop instead of rotating, and the pulley and the engine crank shaft may independently operate accordingly.

Also, in operation S150 of rotating the one-way clutch connected to the pulley in one direction, the inner ring of the one-way clutch connected to the pulley may rotate in one direction. Here, the pulley and the engine crank shaft may independently operate by way of the one-way clutch in such a manner that the coupler receives at least a portion of the one-way clutch, the coupler couples with the outer ring of the one-way clutch, and the pulley couples with the inner ring of the one-way clutch. Accordingly, when the speed difference between the inner ring and the outer ring of the one-way clutch is greater than the specific speed, the inner ring and the outer ring may be separate from each other and the inner ring of the one-way clutch may stop instead of rotating, and the pulley and the engine crank shaft may independently operate accordingly.

Also, when the engine of the vehicle is started by a separate starter, a rotational speed of the engine crank shaft connected to the engine of the vehicle may become higher than that of the pulley. Accordingly, the inner ring and the outer ring of the one-way clutch may mechanically engage with each other and rotate together in operation S170.

That is, when the engine of the vehicle is ON, the accessory operation method may rotate the engine in operation S160, may mechanically engage and rotate the inner ring and the outer ring of the one-way clutch together in operation S170, and may operate the vehicular accessories with the power of the engine in operation S180.

The method of driving the vehicular accessories during the engine stop using the one-way clutch pulley is described above with reference to FIGS. 3 to 7. Accordingly, repeated description is omitted here.

According to the example embodiments, a low-cost motor generator through separating of a starter function may be applied. Also, since the starter function is mounted to the vehicle, the low-cost motor generator may be applied to the vehicle.

In the related art, price of a hybrid vehicle may rise by applying the starter function to the generator. Since relatively great minimum torque is required to start the engine compared to output of about 3 kw required to drive all of the accessories, high output motor of 10 kw or more may be required, which is more than a necessity.

A gasoline vehicle/diesel vehicle according to the related art includes a separate starter device. Accordingly, in the case of modifying the gasoline vehicle/diesel vehicle to a hybrid vehicle, the low-cost motor generator not having the starter function may be applied. According to example embodiments, since the motor generator does not need to function as a starter of the engine, it is possible to save cost.

Further, in the gasoline vehicle/diesel vehicle according to the related art, when the engine stops, a vacuum pump may also stop, which may make it difficult to operate a brake on the slope. Therefore, there is an illegal modification, for example, operating a brake by mounting an electronic vacuum pump, such as an auto brake. According to the example embodiments, although the engine of the existing gasoline vehicle/diesel vehicle stops, it is possible to normally operate the brake on the slope. Also, in the related art, an inefficient method of starting and idly rotating the engine to turn ON an air conditioner needs to be used during a vehicle stop in summer. According to the example embodiments, although the engine stops, it is possible to normally operate the air conditioner.

In particular, according to the example embodiments, since it is possible to use existing parts of the vehicle, it is possible to modify the vehicle at low cost. That is, there is no need to modify accessories, such as, for example, an air conditioner compressor, a hydraulic pump, a coolant pump, and the like. Since a fan belt rotates in one direction, there is no need to modify other parts of the vehicle. If the belt bi-directionally rotates, a separate direction switching device, for example, a solenoid valve, etc., may be required for other parts and a plurality of belts needs to be mounted.

As described above, compared to existing methods, relatively low cost may be used for modification for operating accessories when the engine stops. For example, compared to a method of driving the engine with ah HSG when there is a need to operate accessories of a hybrid vehicle, the example embodiments may reduce price of an accessory operating system to be about a half.

When operation of vacuum and hydraulic pumps stops in a situation in which the vehicle is travelling on the slope or is stopped, it is possible to normally brake and steer the vehicle. Accordingly, it is possible to enhance the stability. Further, when a turbine is at a high temperature after the engine stops, it is possible to prevent an engine failure by continuing circulation of coolant. Accordingly, it is possible to improve the reliability of parts. Also, during the engine stop, it is possible to normally use room cooling, starting, and electronic parts of the vehicle.

According to the example embodiments, since existing parts of the vehicle are used, it is possible to enhance the readability of replacement and to reduce a modification time. For example, compatibility with the existing parts may be applied based on a screw and bolt fastening standard and a separate technical education for modifying the accessory driving system is not required.

The appropriate specification of the one-way clutch may be determined based on a tolerance load and an overrunning speed of the one-way clutch.

The maximum torque to be applied to the one-way clutch (OWC) may be calculated according to the following Equation 1.

Maximum torque applied to OWC=maximum driving power of pulley/minimum driving speed of pulley =required power of (air conditioner compressor+ hydraulic pump+coolant pump+vacuum pump)/ minimum rotational speed of belt  [Equation 1]

The overrunning speed of the one-way clutch may be calculated as follows.

A maximum overrunning speed may be calculated when the engine of the hybrid vehicle is started in a high efficiency area, for example, about 2000 rpm, in a situation in which the engine stops and the motor generator drives the belt.

According to the example embodiments, it is possible to outperform issues that cause an increase in price of a hybrid vehicle equipped with an HSG currently in use. Further, it is possible to drive accessories at low cost during an engine stop while maintaining existing parts and transmission system. Accordingly, it is possible to enhance the safety, for example, brake and steering, of a driver and convenience of the driver.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for operating vehicular accessories during an engine stop, the apparatus comprising:
a one-way clutch including an inner ring and an outer ring; and
a coupler including a first end that is configured to couple to an engine crank shaft of an engine of a vehicle and a second end that is configured to couple to an outer circumference of the outer ring,
wherein the inner ring and the outer ring are configured to mechanically decouple from each other such that the inner ring rotates and the outer ring does not rotate to drive vehicle accessories of the vehicle responsive to the engine being off, and the inner ring and the outer ring are configured to mechanically couple to each other such that the inner ring and the outer ring rotate to drive the vehicle accessories of the vehicle responsive to the engine being on.

2. The apparatus of claim 1, further comprising:
a pulley configured to connect to an inner circumference of the inner ring of the one-way clutch, and
the one-way clutch and the pulley are configured to rotate in one direction.

3. The apparatus of claim 2, further comprising:
a motor generator configured to rotate the pulley while the engine of the vehicle is off to operate the vehicular accessories.

4. A one-way clutch pulley comprising:
a coupler including a first end and a second end, the first end configured to couple with an engine crank shaft of an engine of a vehicle;
a one-way clutch including an inner ring and an outer ring, wherein an outer circumference of the outer ring is configured to couple with the second end of the coupler; and
a pulley configured to connect to an inner circumference of the inner ring of the one-way clutch,
wherein the one-way clutch and the pulley are configured to rotate in one direction and the inner ring and the outer ring are configured to mechanically decouple from each other such that the inner ring and the pulley rotates and the outer ring does not rotate to drive vehicle accessories of the vehicle responsive to the engine being off.

5. The one-way clutch pulley of claim 4, wherein the one-way clutch is configured to operate by overrunning of the outer ring, and
at least a portion of the one-way clutch is inserted into the second end of the coupler such that the coupler is in direct contact with the outer circumference of the outer ring of the one-way clutch and the pulley is directly connected to the inner circumference of the inner ring of the one-way clutch.

6. The one-way clutch pulley of claim 4, further comprising:
a motor generator configured to rotate the pulley while the engine of the vehicle is off to operate vehicular accessories.

7. The one-way clutch pulley of claim 6, wherein the inner ring and the outer ring of the one-way clutch are configured to mechanically decouple from each other when a speed difference between the inner ring and the outer ring is greater than a specific speed responsive to the engine being off, and
the pulley and the engine crank shaft are configured to independently operate in such a manner that, when the engine of the vehicle is turned off, the pulley rotates through driving of the motor generator to rotate the inner ring of the one-way clutch connected to the pulley while the outer ring of the one-way clutch does not rotate.

8. The one-way clutch pulley of claim 6, wherein the motor generator comprises a low level motor configured to drive the one-way clutch and the vehicular accessories without driving the engine crank shaft.

9. The one-way clutch pulley of claim 4, wherein the pulley comprises a single and one-way fan belt pulley.

10. A method of driving vehicular accessories during an engine stop using a one-way clutch pulley, the method comprising:
driving a motor generator when an engine of a vehicle is turned off;
rotating a pulley through driving of the motor generator; and
rotating a one-way clutch connected to the pulley in one direction while the vehicle is turned off such that an inner ring of the one-way clutch that is connected to the pulley rotates, and an outer ring of the one-way clutch that is around the inner ring does not rotate while the pulley rotates,
wherein the rotation of the pulley and the inner ring of the one-way clutch responsive to driving of the motor generator operates vehicular accessories of the vehicle while the engine is turned off.

11. The method of claim 10, wherein the pulley and an engine crank shaft of the engine are enabled to independently operate by way of the one-way clutch in such a manner that at least a portion of the one-way clutch is inserted into an end of a coupler such that the coupler is in direct contact with an outer circumference of the outer ring of the one-way clutch and the pulley is directly connected to an inner circumference of the inner ring of the one-way clutch, and the pulley and the engine crank shaft are enabled to independently operate in such a manner that, when a speed difference between the inner ring and the outer ring of the one-way clutch is greater than a specific speed, the inner ring and the outer ring of the one-way clutch mechanically decouple from each other and the outer ring of the one-way clutch stops rotating.

12. The method of claim 10, further comprising:

mechanically engaging and rotating the inner ring and the outer ring of the one-way clutch together responsive to the motor being turned on.

\* \* \* \* \*